UNITED STATES PATENT OFFICE 2,406,175

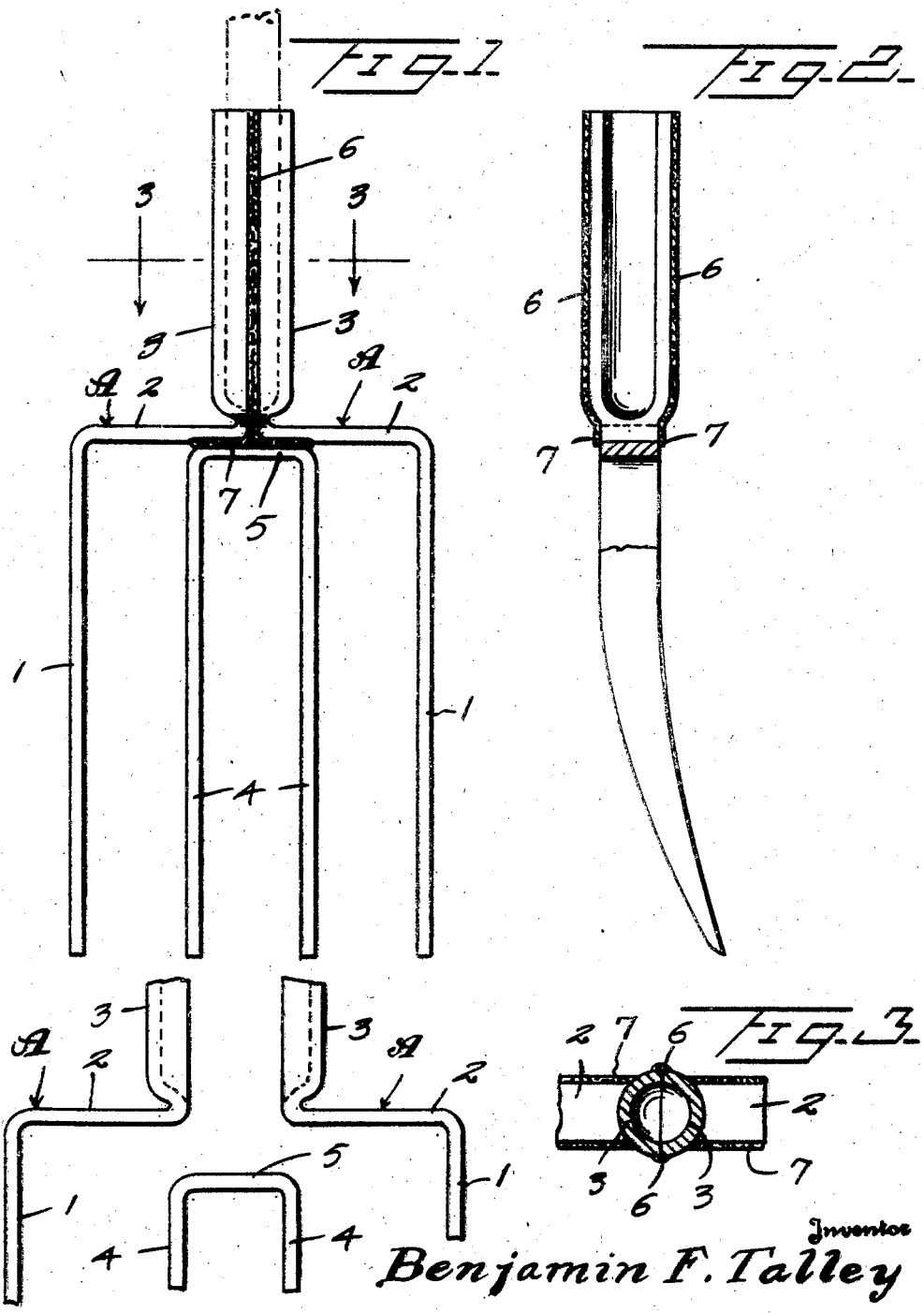

SPADING FORK

Benjamin F. Talley, Culver City, Calif.

Application September 11, 1945, Serial No. 615,641

1 Claim. (Cl. 294—49)

This invention relates to a spading fork and it is an object of the invention to provide an implement of this kind wherein the fork comprises in its construction three parts connected together in a manner to provide a tool wherein is substantially eliminated the liability of bending or breaking the tines.

It is also an object of the invention to provide a fork particularly designed for general purpose use and which readily takes the place of a spade.

The invention consists in the details of construction and in the combination and arrangement of the several parts of my improved spading fork whereby certain important advantages are attained, as will be hereinafter more fully set forth.

In order that my invention may be better understood, I will now proceed to describe the same with reference to the accompanying drawing, wherein:

Figure 1 is an elevational view of a spading fork constructed in accordance with an embodiment of the invention;

Figure 2 is a sectional view taken longitudinally of Figure 1 at substantially the transverse center thereof;

Figure 3 is a sectional view taken substantially on the line 3—3 of Figure 1; and Figure 4 is a fragmentary elevational view showing the several parts in separated relation.

In the embodiment of the invention as disclosed in the accompanying drawing, the improved fork comprises two substantially duplicate side parts A and an intermediate or central part B.

Each of the parts A comprises a tine 1 of desired dimensions and configuration and which is continued at its upper or rear end by a laterally and inwardly disposed substantially straight arm 2 of desired length and which arm 2 is substantially at right angles to the tine 1. The free end portion of the arm 2 is continued by an outwardly extended arm 3 substantially at right angles to the arm 2 and said arm 3 is substantially semicircular in cross section.

The intermediate or central member B is substantially U-shaped in form and the side members 4 thereof constitute tines which are connected at their upper extremities by a substantially straight bar 5. The bar 5 is of a length to space the side members or tines 4 a distance substantially equal to the space between a tine 4 and a tine 1 when the members A and B are in assembly.

In the assembling of the device, the longitudinal margins of the arm 3 are butted and rigidly held together by welding, as at 6. The bar 5 has close contact with the under surface of the connected arms 2 and is rigidly secured thereto by welding, as at 7. As is clearly illustrated in the accompanying drawing, this bar 5 extends equidistantly beyond opposite sides of the center of the fork or the line of welding 6.

The connected arm 3 provides an elongated tubular shank or socket to receive the conventional handle which may be of wood or such other material preferred.

It is to be pointed out that the assembly of the parts A and B assures the fork having a maximum of strength and it is to be noted that the tines 1 and arms 2 are substantially flat as is also true of the side arms or tines 4 and connecting bar 5. The manner of attaching the member B results in the fork being of the greatest strength at the point desired.

From the foregoing description it is thought to be obvious that a spading fork constructed in accordance with my invention is particularly well adapted for use by reason of the convenience and facility with which it may be assembled and operated.

I claim:

A fork comprising two substantially duplicate side members, each including a tine, an inwardly disposed arm at one end portion of the tine and an outwardly disposed arm at the outer extremity of the first arm, said arm being substantially semicircular in cross section, the marginal portions of the arms being in close contact, means for rigidly connecting said marginal portions, and an intermediate member substantially U-shaped in form, the side arms of which constitute tines and the intermediate connecting member having close contact from below with the adjacent end portions of the first-named arms of the side members, and means for rigidly securing said intermediate connecting member to said first-named arms.

BENJAMIN F. TALLEY.